United States Patent [19]

Wiedmann et al.

[11] 4,234,259
[45] Nov. 18, 1980

[54] MIXING APPARATUS FOR KNEADING OF PLASTIC SUBSTANCES

[75] Inventors: Werner Wiedmann, Stuttgart; Hanns-Martin Schmid, Korntal, both of Fed. Rep. of Germany

[73] Assignee: Werner & Pfleiderer, Stuttgart, Fed. Rep. of Germany

[21] Appl. No.: 58,375

[22] Filed: Jul. 17, 1979

[30] Foreign Application Priority Data

Aug. 24, 1978 [DE] Fed. Rep. of Germany ....... 2836940

[51] Int. Cl.³ .......................... B01F 7/08; B29B 1/10
[52] U.S. Cl. ........................................ 366/81; 366/85; 366/300; 366/301; 366/319
[58] Field of Search ................. 366/81, 83, 84, 85, 366/297, 298, 300, 301, 319, 97; 425/201, 204, 209, 200

[56] References Cited

U.S. PATENT DOCUMENTS

| | | | |
|---|---|---|---|
| 3,468,518 | 9/1969 | Koch | 366/84 |
| 3,565,403 | 2/1971 | Matsuoka | 366/84 |
| 3,672,644 | 6/1972 | Crixell | 366/84 |
| 4,058,297 | 1/1977 | Seufert | 366/81 |
| 4,084,263 | 4/1978 | Millauer | 366/84 |

*Primary Examiner*—Robert W. Jenkins
*Attorney, Agent, or Firm*—Browdy and Neimark

[57] ABSTRACT

An internal mixing apparatus for mixing plastic materials, especially raw rubber, has a mixing chamber defined by substantially parallel cylindrical individual chambers. Each of these chambers holds a rotating shaft and the two shafts rotate in opposite directions. In one embodiment of the invention, the shafts have a cylindrical outer surface on which is disposed at least one principal conveying and mixing vane. The vanes on the two parallel shafts are disposed in mirror symmetry so that the ridges of the vanes roll off against one another with or without contact. The principal vanes terminate ahead of the end faces of the mixing chamber, thereby defining free passages permitting the transverse motion of the material to be mixed. Within these passages, the shafts carry scraping vanes for preventing the accumulation of stationary material. In another embodiment of the invention, the vane cores are conical and the height of the vanes changes continuously so that the wall clearance between the ridges of the vanes and the internal walls of the mixing chamber change as a function of axial distance, defining high pressure and low pressure zones. In the high pressure zones, the wall clearance is large, permitting substantial tangential material flow. In a third embodiment of the invention, the vanes on the two shafts interleave, one solid vane engaging an interruption of the opposite vane.

8 Claims, 10 Drawing Figures

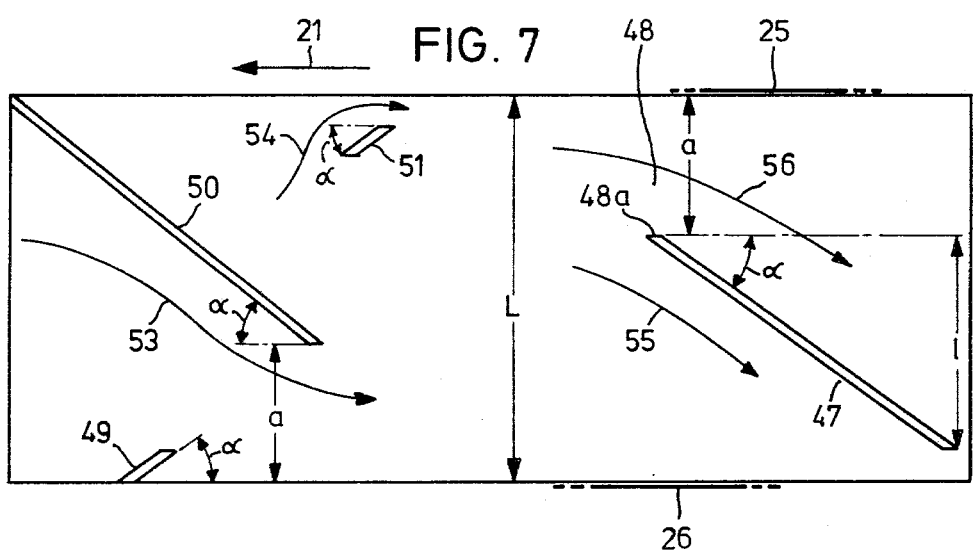
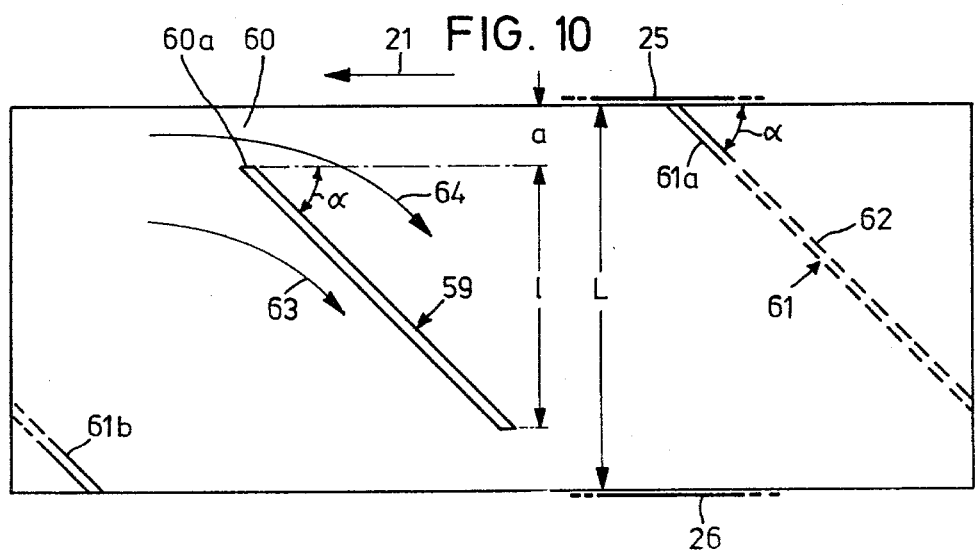

MIXING APPARATUS FOR KNEADING OF PLASTIC SUBSTANCES

FIELD OF THE INVENTION

The invention relates to mixing apparatus, in particular internal mixers for mixing and kneading plastic masses, especially rubber.

BACKGROUND OF THE INVENTION

A known mixing apparatus described in the German Pat. No. 738 787, which represents a type of mixer still used extensively in industry, has two rotating shafts on which are disposed two main mixing and conveying vanes each of which extends toward the middle of the shaft from the ends thereof. The pitch of these vanes is approximately 60° and the upstream end face of the vane is flush with the end face of the mixing chamber. Near the downstream end of the main vanes, the shaft carries auxiliary vanes which have the same pitch as the main vanes but the opposite direction of pitch. Generally, the known mixer which normally handles rubber, performs well in transporting the mechanical energy into the substance to be kneaded. However, it has been shown that locally high temperatures may occur due to the reltively poor heat transfer properties of the apparatus and its contents.

Another known internal mixer is described in the British Pat. specification No. 431,012 and includes two intermeshing kneading rollers each of which has symmetric and oppositely disposed surface features which engage one another while the two shafts or rollers rotate at the same speed and in opposite directions. The point of closest contact between the rollers defines a gap in which temperature peaks can occur due to friction. This internal mixer is effective principally between the two rollers but not between the rollers and the housing and the usable volume is relatively small.

Still another internal mixer, is described in the German Pat. No. 1 679 879, with conical roller or shaft cores and non-interacting vanes which provides a generally well-defined and intensive axial flow of material.

OBJECT AND SUMMARY OF THE INVENTION

It is a principal object of the present invention to provide an improvement for an internal mixer for kneading plastic masses, especially rubber, and including two axially parallel, vaned shafts rotating in the opposite direction. The object of the invention includes improving the vane of geometry so as to increase the rate of material transport through the apparatus, resulting in a more uniform temperature distribution of the mixed materials and better heat transfer than are possible in apparatus known in the art.

These and other objects are attained according to the invention by providing each of the two counter-rotating shafts with at least one principal conveyor and mixing vane whose leading face forms a stream-dividing head and defines a frontal passage together with the associated end face of the housing of the apparatus. It is a feature of one embodiment of the invention that the developed pitch as a function of axial distance does not exceed 40°, that the projected length of the principal vane onto the central plane of the shaft is at least equal to one-half of the entire axial extent of the mixing chamber in which the shaft rotates and that further the ratio of the average clearance between the external portions of the vanes and the chamber wall to the diameter of the mixing chamber is at least equal to 0.02.

The relatively great length of the principal conveyor and mixing vane and the existence of a large space between its front and the chamber at the upstream end cause the formation of a stream dividing edge which results in a continuous splitting of the material stream, a radial overlay of the material by transverse flows and a subsequent rejoining of the mixed material. The relatively great axial extent of the vane results in a very substantial axial displacement of the material. In at least one embodiment of the invention, the pitch angle is reduced while the gap between the vane core and the interior wall of the housing is increased, thereby reducing the radial gap resistance and permitting a relatively high flow of material through the radial gap. This feature increases the rapidity of occurrence of tangential and axial stream division and results in an intensive radial material exchange. Accordingly, the internal temperature of the material is well distributed in a manner which cannot be duplicated by conduction because of the generally low thermal conductivity of the materials such as rubber. Furthermore, the replacement of the boundary layer results in a continuous heat exchange with respect to the cooled housing of the apparatus as well as to the metallic and thus heat-conducting vanes which may, in addition, be cooled internally.

In at least some embodiments of the invention, the rotating shafts also carry scraping vanes. In still another embodiment of the invention, each rotating shaft carries two principal vanes one of which has a gap that is engaged by the continuous vane on the opposite rotating shaft.

Further advantages and objects of the invention will emerge from a reading of the following detailed description of preferred exemplary embodiments, together with the drawing.

BRIEF DESCRIPTION OF THE DRAWING

FIG. 7 is a planar development of the edges of the vanes in FIGS. 5 and 6;

FIG. 10 is a planar development of the edges of the vanes in FIGS. 8 and 9.

DESCRIPTION OF THE PREFERRED EMBODIMENTS

Figure 1:
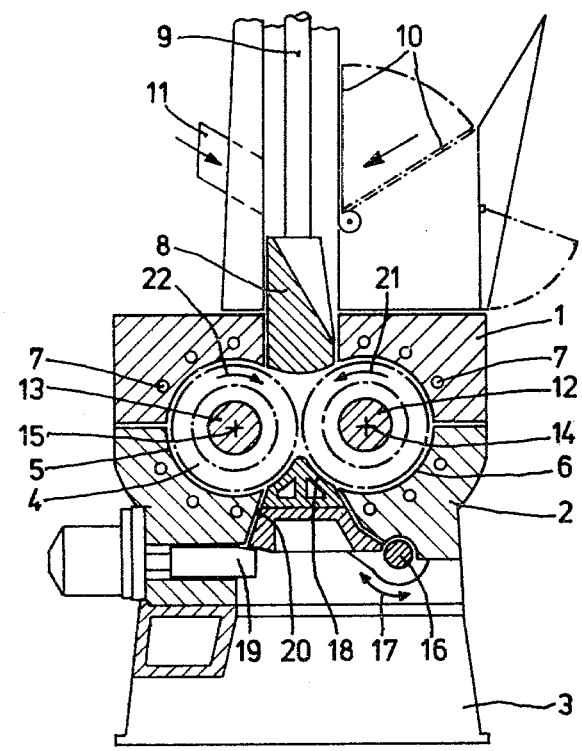
FIG. 1 is a vertical sectional view of a common overall illustration of a mixing apparatus according to the invention.

The basic construction of the apparatus, which is common to all embodiments to be described below, includes a mixer housing having an upper housing portion 1 and a lower housing portion 2 which rests on a base or pedestal 3. The interior of the housing 1, 2 defines a mixing chamber 4 having an interior wall 5, 6 in the shape of two axially parallel and horizontally disposed cylinders, the geometrical extents of which may be in contact or may intersect to a limited degree.

Both parts of the housing 1, 2 may be provided with cooling channels 7 for cooling the vicinity of the mixing chamber 4. The material to be mixed may be supplied to the mixing chamber 4 by a piston 8 moving downwardly under pressure and actuated by a hydraulic actuator, not shown, via a piston rod 9. When the piston 8 is raised, the material to be mixed, for example uncured rubber, is introduced through an opening which may be closed off by a pivotable flap 10. A secondary opening 11 can serve to admit additional components, especially powdered additives.

Two shafts 12, 13 having central axes 14, 15 are disposed coaxially within the cylinders 5 and 6 and are capable of rotation around the axes 14, 15. The shafts 12, 13 carry differently configured kneading vanes whose exact shape and number varies in the embodiments to be described below and which are indicated in FIG. 1 only schematically.

A pivotable base member 18 is capable of pivotal motion about a shaft 16 in the manner indicated by the arrow 17. In its top position, the base member 18 can be locked in place by a hydraulic lock 19. In the lower position, the base member 18 permits access to the mixing chamber 4 through an opening 20 for the purpose of emptying and cleaning the mixing chamber 4 subsequent to the mixing and kneading process. The general features of the internal mixer illustrated in FIG. 1 are described in U.S. Pat. No. 4,058,297.

The shafts 12, 13 are rotated in opposite directions of rotation, i.e., according to the arrows 21, 22, respectively. The direction of rotation is such that the vanes to be described below mounted on the shafts 12, 13 travel downwardly, i.e., toward the machine base 3 in the region of mutual approach or contact.

The shafts 12, 13 are mounted rotatably in bearings 23, 24 which are disposed in end faces 25, 26 of the cylindrical mixing chamber 4. The shafts 12, 13 are rotated by per se known drive means, not shown, possibly over a transmission. The dividing plane between the upper housing 1 and the lower housing 2 would normally coincide with the plane defined by the parallel axes 14, 15 of the shafts 12, 13.

Figure 2:
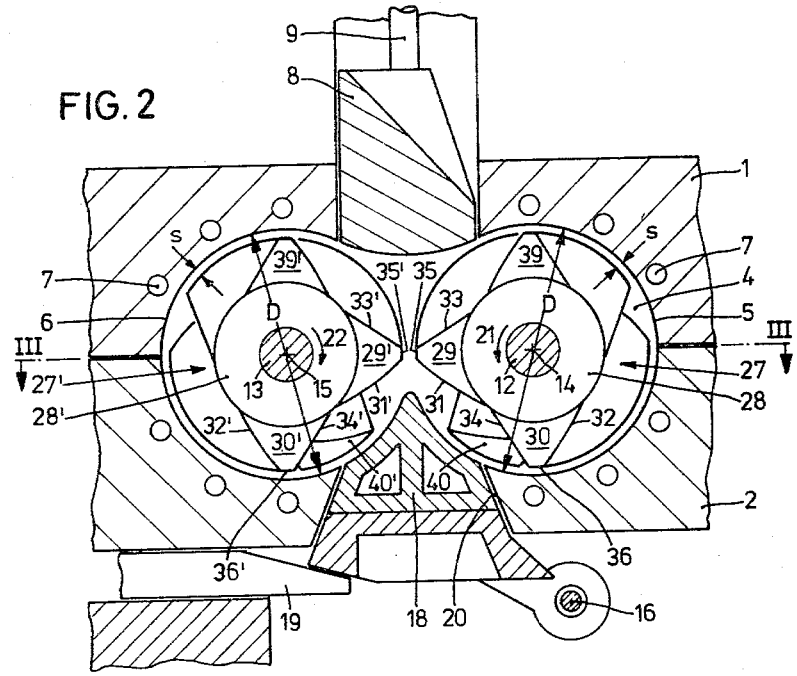
FIG. 2 is a vertical cross section through a portion of a first embodiment of a mixer according to the invention.
Figure 3:
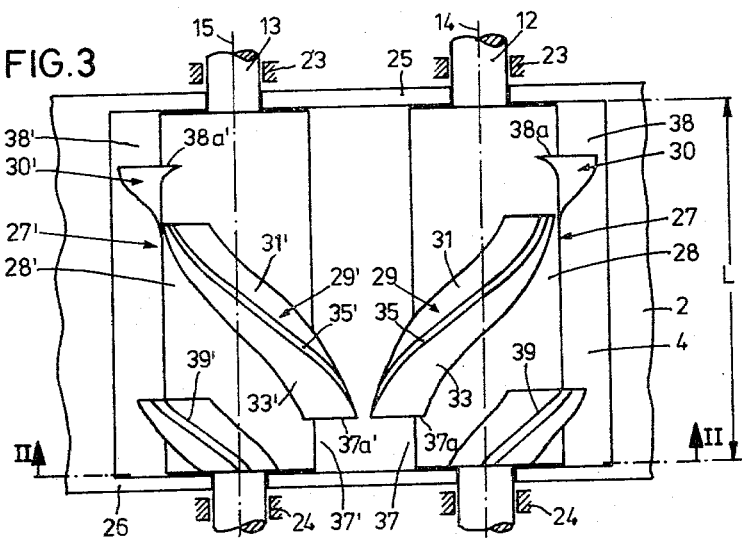
FIG. 3 is a horizontal section along the line III—III of FIG. 2.
Figure 4:
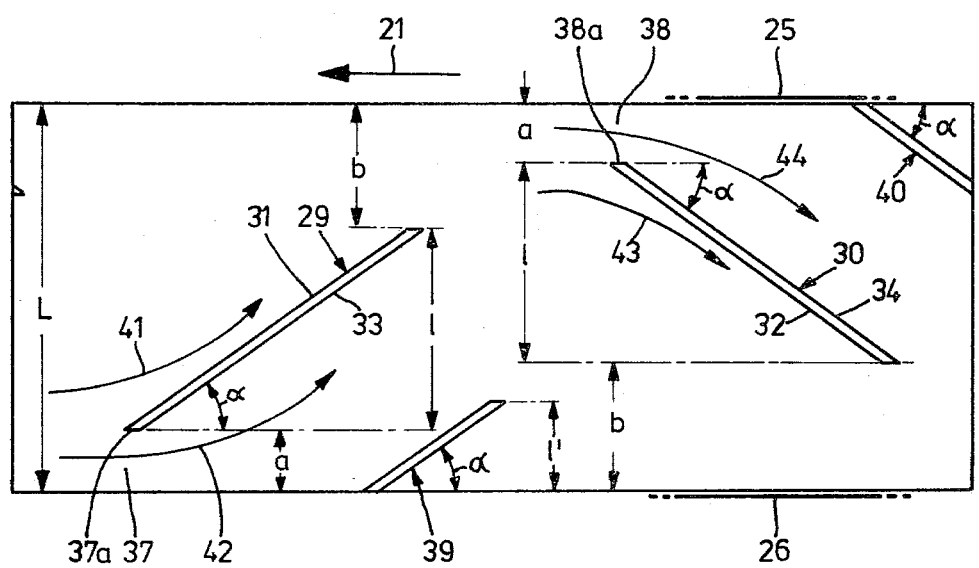
FIG. 4 is a planar development of the edge of a vane in FIGS. 2 and 3.

In the first exemplary embodiment of the invention, illustrated in FIGS. 2-4, each of the shafts 12, 13 has a mixing and kneading vane 27 (27'). Each shaft has a cylindrical core 28, 28' which extends over a length L, substantially equal to the axial extent of the mixing chamber 4 except for the necessary end play. Each cylindrical core 28, 28' carries two principal conveyor and mixing vanes 29, 30 and 29', 30'. These vanes, as is best seen in FIG. 2, have a cross section such that, in the direction of rotation 21 or 22, the leading surface which makes contact with the material to be mixed, as well as the trailing surfaces 33, 34 or 33', 34' are lightly convex.

The vanes 29, 30 disposed on the core 28 and the vanes 29', 30' which are located on the other core 28' are so disposed that the vanes 29 and 29' form a pair whose radially outermost edges move tangentially. The same holds true for the pair of vanes 30, 30'. In other words, when the shafts rotate, the ridges 35 and 35' of the vanes 29 and 29', respectively, generally roll off against one another with or without actual contact. The same is true for the ridges of the vanes 30 and 30'. The shafts may be rotated at varying speeds so as to increase the randomness of the transverse displacement of material. If the shafts are rotated at the same speed and the position of the vane structure is displaced by 90° with respect to that illustrated in FIGS. 2 and 3, the two rotating shafts may be moved closer to one another, thereby causing engagement or interleaving of the vanes.

As shown in the plane development in FIG. 4, the leading axial end of the vanes 29, 30 defines a generally open passage at the ends of the mixture chamber, i.e., a passage 37, 37' and a passage 38, 38', the axial length of each of which is "a". The leading edges 37a,38a, or 37'a, 38'a of the vanes define a stream dividing feature.

Each of the vanes 29, 30 and 29', 30' extends from the respective end passages 37, 38 and 37', 38' in a direction opposite to the respective direction of rotation 21 or 22 at an angle α with respect to a plane normal to the axis of rotation. The pitch angle α serves as a measure for the conveyor effect of the vanes with respect to the direction of the axes 14 and 15.

The projection of the length of each vane 29, 30 or 29' 30' onto an imaginary plane containing the axes 14 or 15 is designated with the lower case letter "l". The distance from the other end of the vane to the end of the mixing chamber 4 is "b" which is thus equal to L−l−a. At the respective ends of the shafts are carried scrapers 39, 40 and 39', 40', respectively, having a projected length l' at least equal to but suitably somewhat greater than "a" so as to prevent the accumulation of static material within the end passages 37, 38 and 37', 38'. Both the cross-sectional profile and the pitch angle α of the scrapers are equal to that of the vanes 29,30 and 29',30'. The cross-sectional diameter of each cylinder within the mixing chamber 4 is D. The radial clearance between the ridges 35, 36 or 35',36' of the vanes and the associated wall 5 or 6 of the mixing chamber 4 is labeled "s" and the same applies to the scrapers 39, 40 and 39', 40'.

In this first embodiment of the invention, the best mode of construction was found when the various parameters fell in a range centered on the following values.

L/D=1.25±0.10
l/L=0.50 to 0.70
a/L=0.15 to 0.35
α=35°±5°
s/D=0.0275±0.0075

As is indicated by the arrows 41-44 in FIG. 4, the material to be mixed, usually rubber, is parted by the stream dividing heads 37a, 38a, and 37'a,38'a so that a part of the material follows the arrows 42 and 44 through the open passage 37, 38 or 37', 38' while the other part of the material follows the arrows 41 and 43. The illustration of FIG. 4 also shows that, during each rotation of the shafts 12 and 13, the material is displaced twice in the axial direction from the middle of the chamber toward the ends. The result is an extraordinarily intensive mixing with a constant relayering of the material and a continuous renewal of the boundary or surface layer so that any temperature peaks which may tend to occur within the material are immediately decreased by distribution and mixing of the material.

Figure 5:
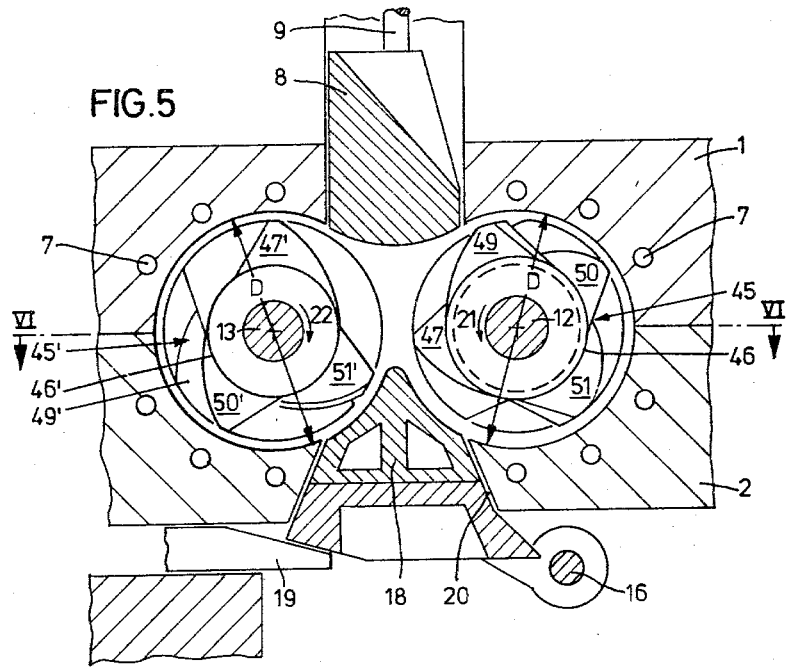
FIG. 5 is a vertical sectional illustration of a second embodiment of the invention.
Figure 6:
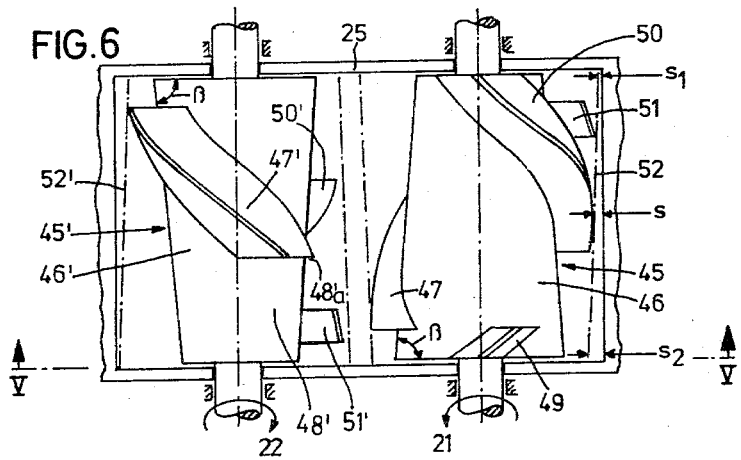
FIG. 6 is a horizontal section through the embodiment of FIG. 5 along the line IV—IV.

A second embodiment of the invention is illustrated in FIGS. 5-7 wherein parts identical to those already discussed with respect to the first embodiment are retained. In this second exemplary embodiment, the shafts 12, 13 carry vanes 45, 45' whose cores 46, 46' are seen to be frustoconical with a cone angle β of approximately 80°. Each core 46, 46' carries a first principal conveying and mixing vane 47, 47' which defines a free passage 48, 48' having an axial extent "a". The upstream end of the vane also defines a stream-dividing head 48a, 48'a. The vane terminates at some distance from the other end face. At this downstream passage, the shafts carry a scraper 49, 49'.

Also disposed on each of the cores 46 and 46' is a second principal conveying and mixing vane 50, 50' which extends from the end passage 48, 48' over somewhat more than half the axial extent of the cores, overlapping the end passages 48, 48' and thus serving as a scraper. Also disposed on the shafts in association with the vanes 50, 50' and extending respectively in the two directions of rotation 21, 22 is a relatively short inflow vane 51, 51' which has an axial shape somewhat like a scraper but does not serve that function but rather to prevent the existence of dead spaces.

The pitch angle of all the vanes on the shafts, i.e., the vanes 47, 47', 50, 50', the scrapers 49, 49' and the inflow vanes 51, 51', i.e., the angle $\alpha$ with respect to a plane normal to the axes 14, 15, is the same; for example, each of the vanes 50, 50' extends from the associated end wall 25 inwardly and opposite to the direction of rotation 21. The second vane 47, 47' is parallel to the first vane but displaced by approximately 180° of circumferential position. The angle of the scrapers 49 and 49' is opposite to one another as is that of the inflow vanes 51 and 51'.

Each of the shafts with all of its vanes is identical to the other except that they are placed in the machine with the ends reversed, i.e., after a rotation of 180° in the plane of the axes 14, 15.

As may be seen in FIG. 6, the height of the vanes 47, 50 and 47' and 50' as well as of the scrapers 49 and 49' and the inflow vanes 51, 51' increases as the inclination of the cores 46, 46' decreases, resulting in an effective outer figure of rotation 52,52' which is also seen to be frustoconical. As a result, the clearance of the vanes, inflow vanes and scrapers with respect to the outer walls varies axially from a minimum $s_1$ up to a maximum $s_2$, the mean clearance again being s (see FIG. 6).

The best mode of the invention in this second embodiment incorporates the following dimensions.

$L/D = 1.25 \pm 0.10$
$l/L = 0.50$ to $0.70$
$a/L = 0.15$ to $0.35$
$\alpha = 35° \pm 5°$
$s/D = 0.0275 \pm 0.0075$
$s_1/s_2 = 1/3.5$ As in the first embodiment, the cross section of the vanes, the inflow vanes and the scrapers is substantially the same as in the illustration of FIGS. 2-4.

The region containing the relatively large core diameters defines the pressure zone of the chamber while the region containing the relatively low core diameters is substantially free of pressure. As already discussed, the radial play of the vanes is greatest in the pressure zone, thereby permitting a relatively high tangential rate of material flow. Conversely, the relatively small radial play in the pressure-relieved region results in good scraping action and the prevention of remnant deposits on the walls 5, 6 of the mixing chamber 4.

The conical form of the cores 46, 46' also enhances a high axial material flow as indicated by the arrows 53, 54, 55, 56 in FIG. 7. The displacement of the two main systems, i.e., that the vane 50 on the shaft 13 is followed, for example, by the vane 47 of the shaft 12 which imparts the opposite direction of material transport, results in a counter-transport according to the arrow 54 with respect to the flow in the direction of the arrow 5, and the presence of the inflow vanes 51, 51' prevents the formation of dead zones in the pressure-free regions.

Figure 8:
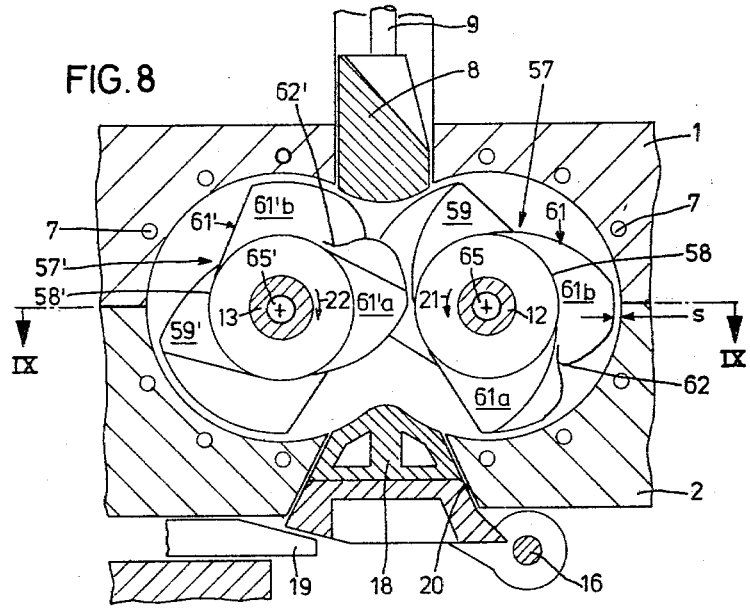
FIG. 8 is a vertical section of a third embodiment of the invention.
Figure 9:
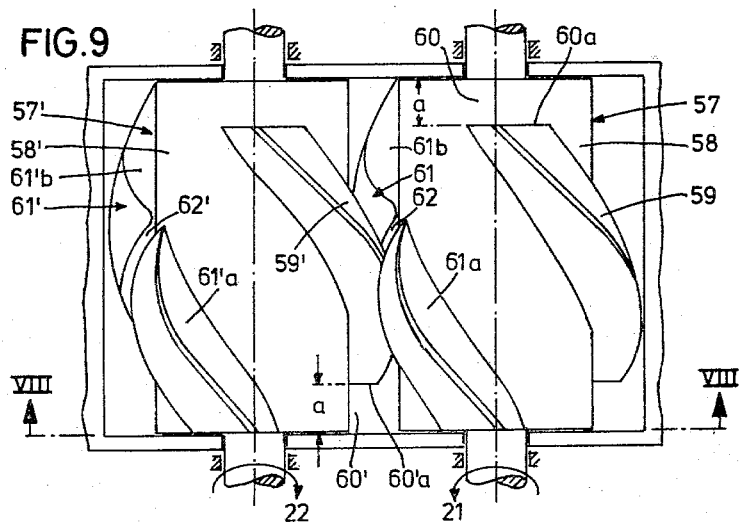
FIG. 9 is a section through the embodiment of FIG. 8 along the line VIII—VIII.

The FIGS. 8-10 describe the third embodiment of the invention. Whereas in the first and second embodiments of the invention, the at most tangential contact of the ridges of the vanes required the separation of the two axes 14, 15 to be at least equal to D−2 s, it is a feature of the present third embodiment that the separation of these axes 14, 15 is substantially smaller than D−2s, thereby providing for interleaving of the two vane geometries. The overall construction of the housing and the shafts and other parts of the apparatus remain similar or identical to the embodiments already described and maintains the same reference numerals. As in the first embodiment, the shafts 12, 13 have cylindrical cores 58, 58' on which are mounted vanes 57, 57'. These vanes consist of first principal conveyor and mixing vanes 59, 59' which are seen to be parallel to one another. Their leading ends, as seen in the direction of rotation 21 or 22, define passages 60, 60' of an axial extent "a". The vanes 59, 59' are located approximately in the middle of the cores 58, 58' so that the distance from the ends of the vanes to the end face of the chamber is also approximately "a".

In this embodiment of the invention, each core 58, 58' also carries a second principal conveyor and mixing vane 61, 61' approximately parallel to but displaced by approximately 180° with respect to the vanes 59, 59'. The vanes 61, 61' extend over the full axial extent of the cores 58, 58' but each of them includes an interruption 62, 62' which permits the interleaving of associated pairs of vanes 59 and 62' or 59' and 62 as is best seen in the middle of FIG. 9. The interruption 62, 62' divides the vanes 61, 61' into portions 61a, 61b and 61'a, 61'b. A best mode of the third embodiment of the invention places the relevant dimensions in the following ranges.

$L/D = 1.25 \pm 0.10$
$l/L = 0.50$ to $0.70$
$a/L = 0.15$ to $0.35$
$\alpha = 35° \pm 5°$
$s/D = 0.0275 \pm 0.0075$ As illustrated by the arrows 63, 64 in FIG. 10, the third embodiment of the invention also provides for an intensive axial material flow, the flow of material being divided at the end passages 60, 60' by the divider heads 60a, 60'a. At the same time, the other counter-rotating shaft provides for the opposite direction of material flow. The relatively great wall clearance "s" permits a high degree of tangential leakage. Simultaneously, the roll-off of the vanes 59, 59' in the respective interruptions 62',62 of the vanes 61', 61 provides for a high-pressure deformation of the material and a radially directed layering.

The cross section of all the vanes is substantially the same as previously described.

In all embodiments of the invention, it is suitable and advantageous if the shaft, the vane core and the vanes themselves including any scrapers or auxiliary vanes are constructed integrally, i.e., of one piece of material, for example by casting.

It is also suitable and advantageous if the vanes are hollow so as to permit internal cooling. Such cooling is indicated in FIG. 8 by coolant channels 65, 65' within the shafts 12, 13.

The foregoing description is confined to preferred exemplary embodiments of the invention but does not exclude numerous variants and embodiments thereof, all of which may lie within the scope and spirit of the invention .

We claim:

1. A mixing apparatus comprising:
    a housing;
    a mixing chamber defined within said housing, said mixing chamber including two counter-rotating parallel shafts on which are disposed radially extending vane means, said vane means including at least one principal conveying and mixing vane on each shaft, the upstream end of said principal vane defining a stream-dividing head which terminates at an axial distance from an end face of said mixing chamber, said axial distance thereby defining a frontal passage of said mixing chamber, and wherein the pitch angle ($\alpha$) of said vane means is maximally 40°, the ratio of the axial projected length (l) of said vane means to the axial length (L) of the mixing chamber is at least 0.5 and the ratio of the average clearance (S) between the ridge of said vane means and the interior walls of said mixing chamber to the diameter (D) of the mixing chamber is at least 0.02.

2. A mixing apparatus according to claim 1, wherein each of said vane means includes two principal conveying and mixing vanes on each shaft, associated vanes on different shafts being disposed in mirror symmetry.

3. A mixing apparatus according to claims 1 or 2, further comprising a scraper vane located on said shaft downstream of said frontal passage.

4. A mixing apparatus according to claim 1 (FIGS. 5-7), wherein said vane means includes a conical vane core (46,46') carrying at least one vane (47,47') of varying height; whereby the play (S) between the ridge of said vane (47,47') and the interior wall of said mixing chamber increases in the opposite axial direction.

5. A mixing apparatus according to claim 1, wherein the pitch angle ($\alpha$) of said vane means lies in the range extending from 30° to 40°.

6. A mixing apparatus according to claim 1, wherein the ratio of the axial projected length (l) of said vane means to the axial length (L) of the mixing chamber obeys l/L=0.5 to 0.7.

7. A mixing apparatus according to claim 1, wherein said vane means on the two parallel shafts intermesh and include a first principal vane (59,59') and a second interrupted principal vane (61,61') the overall length of which is substantially equal to the axial length (L) of the mixing chamber, the interruption in said vanes (61,61') serving to receive portions of said first principal vanes (59,59') during mutual engagement.

8. A mixing apparatus according to claim 1, wherein the ratio of the axial length (a) of said frontal passage to the axial extent (L) of the mixing chamber obeys a/L=0.15 to 0.35.